(12) United States Patent
Bell

(10) Patent No.: US 7,755,056 B2
(45) Date of Patent: Jul. 13, 2010

(54) SENSOR WITH TRIGGER PIXELS FOR IMAGING OF PULSED RADIATION

(75) Inventor: Raymond Thomas Bell, Stanmore (GB)

(73) Assignee: E2V Technologies (UK) Limited, Chelmsford (GB)

( * ) Notice: Subject to any disclaimer, the term of this patent is extended or adjusted under 35 U.S.C. 154(b) by 106 days.

(21) Appl. No.: 11/489,710

(22) Filed: Jul. 20, 2006

(65) Prior Publication Data

US 2007/0176109 A1     Aug. 2, 2007

(30) Foreign Application Priority Data

Jul. 21, 2005     (GB) .................................. 0514998.4

(51) Int. Cl.
  *G01T 1/16*     (2006.01)
  *G01T 7/00*     (2006.01)
(52) U.S. Cl. ............................. 250/370.09; 250/370.08; 378/19
(58) Field of Classification Search ............. 250/370.09, 250/370.08; 378/19
  See application file for complete search history.

(56) References Cited

U.S. PATENT DOCUMENTS

| 5,331,166 | A |   | 7/1994  | Crosetto et al. |
| 5,444,756 | A | * | 8/1995  | Pai et al. .................... 378/98.8 |
| 5,510,623 | A |   | 4/1996  | Sayag et al. |
| 5,694,448 | A |   | 12/1997 | Morcom |
| 5,887,049 | A | * | 3/1999  | Fossum .................... 378/98.8 |
| 5,912,942 | A |   | 6/1999  | Schick et al. |
| 6,002,742 | A |   | 12/1999 | Nelvig |
| 6,307,915 | B1 | * | 10/2001 | Frojdh ....................... 378/98.8 |
| 6,380,528 | B1 |  | 4/2002  | Pyyhtiä et al. |
| 6,401,854 | B2 |  | 6/2002  | Yano et al. |
| 6,775,351 | B2 |  | 8/2004  | Rinaldi et al. |
| 6,797,960 | B1 |  | 9/2004  | Spartiotis et al. |
| 6,856,350 | B2 |  | 2/2005  | Orava et al. |
| 2001/0005225 | A1 | * | 6/2001 | Clark et al. ................. 348/302 |
| 2003/0002624 | A1 | * | 1/2003 | Rinaldi et al. .............. 378/98.8 |

* cited by examiner

*Primary Examiner*—David P Porta
*Assistant Examiner*—Yara B Green
(74) *Attorney, Agent, or Firm*—Venable LLP; Robert Kinberg; Kyle D. Petaja

(57) ABSTRACT

A radiation sensor 10 includes an array of imaging pixels 13 electrically connectable to a readout port. At least one first peripheral row of trigger pixels 11 is located at a first edge of the array, the trigger pixels also being electrically connectable to the readout port but responding faster to x-rays than the imaging pixels. At least one second peripheral row of trigger pixels 12 may be located at a second edge of the array opposed to the first edge. Trigger pixels 11, 12 from the first and second peripheral rows may be addressable alternately in a predetermined pattern to detect a radiation signal for triggering the sensor. Various methods of clocking the sensor are also described. The sensor has particular applicability to intra-oral x-ray imaging.

11 Claims, 5 Drawing Sheets

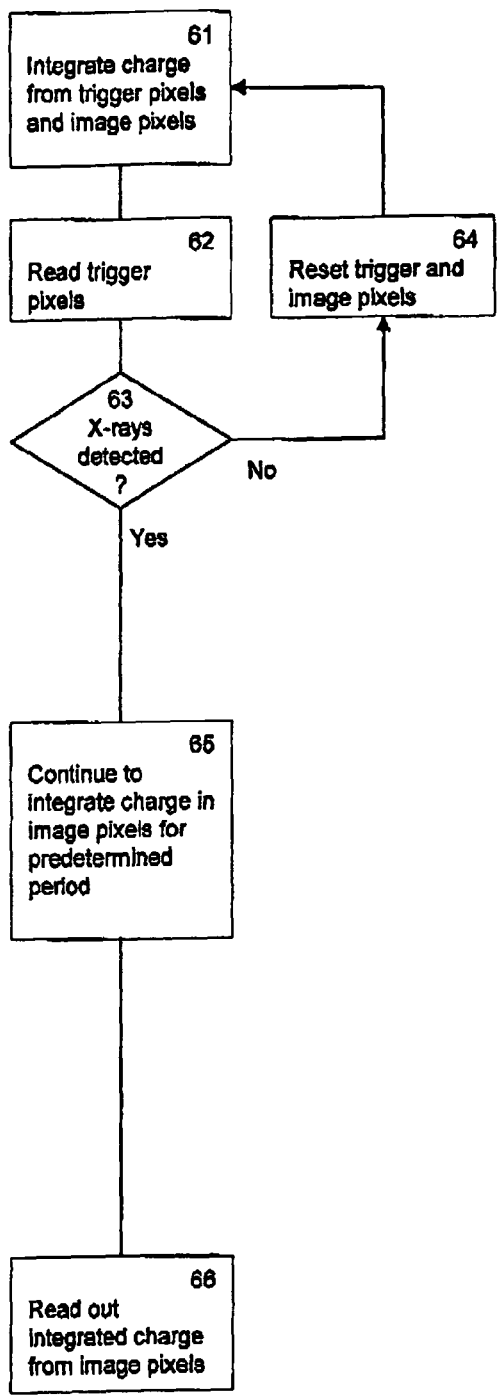
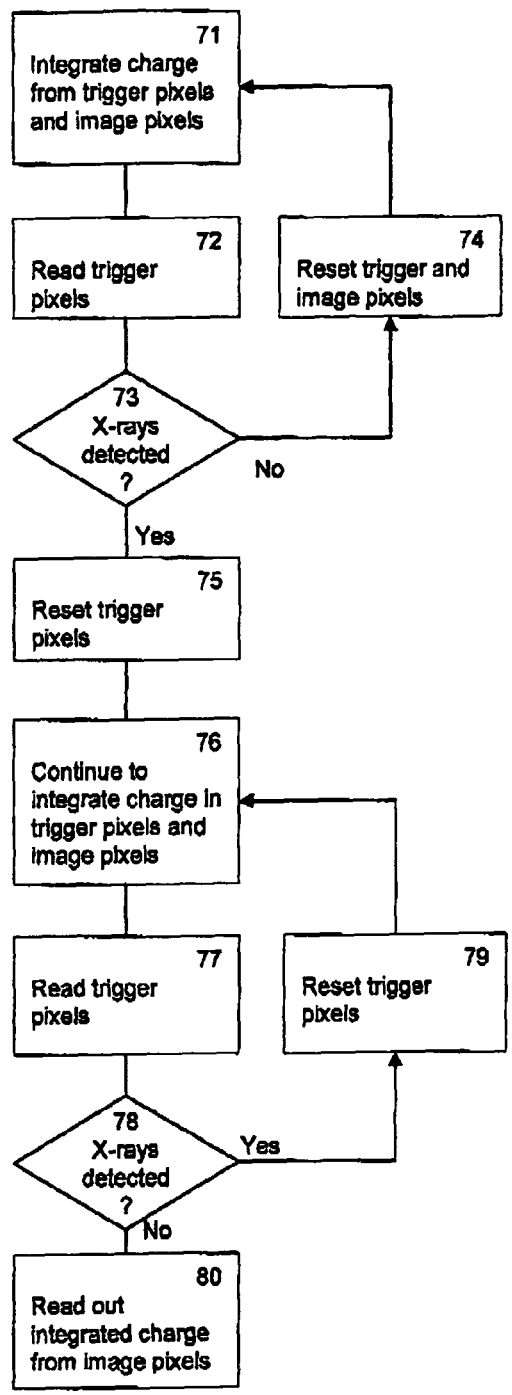
Figure 6
Figure 7

SENSOR WITH TRIGGER PIXELS FOR IMAGING OF PULSED RADIATION

FIELD OF THE INVENTION

This invention relates to triggering a radiation sensor, particularly an x-ray sensor, more particularly an intra-oral x-ray sensor.

BACKGROUND OF THE INVENTION

It is known to use solid-state imagers for imaging x-rays. It is desirable to synchronize image capture by the image sensor with output of an x-ray generator. This may be done by triggering the sensor on when x-rays are being received at the sensor and triggering the sensor off when the x-rays are no longer being received. This may enable the sensor to be cleared of signal accumulated from dark current before imaging. Since the image capture is closely synchronized to the source, with little or no loss of image signal, the radiation or x-ray dose (e.g. to a patient) is minimized.

In a known arrangement the image sensor is electrically connected to an x-ray source and image acquisition is controlled by a timer of the x-ray source. However, this requires customizing the sensor to the x-ray source.

U.S. Pat. No. 5,331,166 discloses an x-ray detecting device including an x-ray intensity detecting element, such as a phototransistor, in a casing adjacent to an x-ray fluorescent element of the detecting device. When an accumulated x-ray dose becomes equal to a preset x-ray dose required to obtain optimum image quality, x-ray radiation is stopped.

U.S. Pat. No. 5,510,623 discloses a CCD image sensor array which has a two-block, full-frame, parallel register structure which feeds into a single central serial read-out register. If the centre read-out register is not light-shielded, the register can be used to detect the onset and termination of an exposure. An external threshold circuit is used to determine a beginning and end of incoming radiation. Prior to illumination a background level, including dark signal generation, is monitored. An integration period is begun when the threshold circuit detects an increase in signal. As illumination ends, the same threshold detection methodology is used to detect the end of illumination.

In U.S. Pat. No. 5,694,448 a CCD solid-state imager is continually clocked out in a wait period prior to irradiation by an x-ray source. A signal derived from the CCD imager is compared with a predetermined threshold to determine onset of irradiation by the x-ray source, which appears as a rapid change in the signal level. The predetermined threshold may be selected dependent on ambient conditions to allow for consequential changes in dark current.

U.S. Pat. No. 5,912,942 discloses that in preference to an Active Pixel Sensor (APS) CMOS away incorporating several event trigger diodes which are monitored by computer to determine a start and end of an x-ray exposure, since event trigger diodes lower the manufacturing yield of the array, and in any case the event trigger diodes may be obscured by the object being imaged, preferably, instead, data stored in the entire array is constantly read out. Once readout of the entire array is completed, the data is stored in a memory as a frame and compared to a dark current frame before exposure to x-rays. If some of the data in the frame is sufficiently different, it is determined that the x-ray source was turned on during the frame and the frame is stored. The subsequent fame is also stored and the frame after that stored as a dark frame, in which it is known that no x-radiation occurred, since the frame time is set to be greater than the exposure time. The data in the dark frame is subtracted from the first and second frames and the first and second frames added to obtain the exposure data.

U.S. Pat. No. 6,002,742 discloses a number of detector points for x-radiation provided at or in a CCD cell to minimize an accumulated radiation dose to what is needed for exact exposure of an image. Radiation is detected by at least three sensing diodes behind an image array. Alternatively, the CCD image array is used as the x-ray sensor.

In U.S. Pat. Nos. 6,307,915 and 6,401,854 a number of randomly distributed pixels in a solid-state x-ray imager, having non-destructive readout ability, are designated as reference pixels, to avoid missing exposures due to shading by the object being imaged. The distribution of reference pixels may be random or in a limited number of rows or columns. In one embodiment two sets of columns are selected as the reference pixels, preferably on opposite sides of the imaging array, and an average of the pixel values along a column is taken. The reference pixels are continuously monitored, and if a signal level of a predetermined minimum number of pixels exceeds a predetermined threshold, an image capture sequence starts. An image capture controller may also randomly select second reference pixels to determine an end of x-ray exposure. Additional circuitry is required on the array chip to select the reference pixels and compare their signal with a reference signal. The selected columns are reset at a 10 Hz frame rate to avoid dark current building up while waiting for an x-ray event and the rest of the array is held in reset to avoid any dark current building up. An end of exposure is determined either by a timer or by determining when signal on the reference signals is no longer increasing by more than an increase caused by the dark current.

U.S. Pat. No. 6,380,528 discloses a radiation sensor element integral with an array of image elements in which the radiation sensor output is preferably continuously supplying a signal and the radiation detector cell is preferably more responsive to incident radiation than an image element detector cell—for example the radiation detector cell is larger than the image element cell. The radiation detector cell may comprise a guard ring around the image array. Preferably threshold circuitry is coupled to the radiation sensor output and image acquisition is initiated responsive to a trigger signal from the threshold circuitry.

U.S. Pat. No. 6,775,351 discloses dental x-ray imaging equipment providing automatic detection of x-ray emission for transition to an image integration and acquisition phase. A solid-state imager, such as a CCD, is continually clocked during a standby phase prior to irradiation. A control unit analyses output of the imager, detecting variation caused by a start of x-ray emission using appropriate threshold levels. For example, pixels are identified for which an output exceeds a first threshold and the number of such pixels counted to determine whether the number exceeds a second threshold.

U.S. Pat. No. 6,797,960 discloses a radiation imaging assembly including bias monitoring means for determining radiation incident on an image element detector. The bias of either some or all of the detector elements is monitored, to provide a substantially instantaneous or real-time response to incident radiation by detecting increases and decreases in bias corresponding to increases and decreases in radiation intensity to initiate trigger signals. Changes in the bias current occur with changes in x-ray intensity incident on the imaging device due to charge pairs generated in a detection zone in response to incident radiation migrating to respective electrodes. The greater the intensity of x-radiation, the greater a number of charge pairs created.

In U.S. Pat. No. 6,856,350 a semiconductor radiation imaging device includes threshold circuitry configured to discard radiation hits on a pixel detector of the device which are outside a predetermined threshold range.

Therefore, principal shortcomings of the prior art may be summarised as follows. Some known imagers require additional off-chip sensing elements e.g. external photodiodes or fairs. These, and others which have additional on-chip trigger photodiodes, require separate readout circuits for the trigger signal. This additional complexity increases cost and reduces yield. The ESD/EMC susceptibility of the prior art devices also gives false triggers.

If image photosites are also used for triggering they cannot be separately optimized for both imaging and triggering.

Schemes which use a sparse array of image pixels for triggering require more complex address circuits or operational modes and risk introduction of fixed pattern noise in the image as a result of some pixels having been treated differently from others.

Some of the prior art is applicable only to CCD sensors, which add signals in the charge domain by means of special clocking. CCD-based trigger schemes tend to produce smeared or ghost images from x-rays received before the sensor is triggered.

It is an object of the present invention at least to ameliorate shortcomings in the aforesaid prior art.

BRIEF SUMMARY OF THE INVENTION

According to a first aspect of the present invention there is provided an x-ray radiation sensor comprising an array of imaging pixels electrically connectable by addressing means to a readout port and at least one first peripheral row of trigger pixels at a first edge of the array and at least one second peripheral row of trigger pixels at a second edge of the array opposed to the first edge, the trigger pixels being electrically connectable to the readout port; wherein: the trigger pixels have a more rapid response to detection of x-rays than the imaging pixels; and the trigger pixels are readable by the same addressing means as the array of imaging pixels.

Preferably, the x-ray sensor further comprises at least one second peripheral row of trigger pixels at a second edge of the array opposed to the first edge.

Preferably, the trigger pixels from the first and second peripheral rows are addressable alternately in a predetermined pattern.

Conveniently, at least one first peripheral row of trigger pixels is spaced from the first edge of the array.

Advantageously, at least one first peripheral row of trigger pixels is spaced from the first edge of the array by dark reference or dummy pixels.

Conveniently, at least one second peripheral row of trigger pixels is spaced from the second edge of the array.

Advantageously, at least one second peripheral row of trigger pixels is spaced from the second edge of the array by dark reference or dummy pixels.

Preferably, the trigger pixels are more sensitive to radiation than the image pixels.

Conveniently, each of the trigger pixels has a larger radiation detection area than each of the image pixels.

Advantageously, the radiation sensor is arranged for use as an intra-oral x-ray imager.

According to a second aspect of the invention, here is provided a method of triggering an x-ray radiation sensor comprising an array of image pixels electrically connectable to a readout port by addressing means, the method comprising: providing at least one first peripheral row of trigger pixels at a first edge of the array and at least one second peripheral row of trigger pixels at a second edge of the array opposed to the first edge, the trigger pixels being electrically connectable to the readout port by the addressing means and having a more rapid response to detection of x-rays than the imaging pixels; and addressing the trigger pixels firm the first and second peripheral rows to detect a radiation signal for triggering the sensor.

Preferably, the method further comprises providing at least one second peripheral row of trigger pixels at a second edge of the array opposed to the first edge.

Preferably, the method comprises addressing the trigger pixels from the first and second peripheral rows alternately in a predetermined pattern.

Conveniently, providing at least one first peripheral row of trigger pixels comprises providing at least one first peripheral row of trigger pixels spaced from the first edge of the array.

Advantageously, the method comprises providing at least one first peripheral row of trigger pixels spaced from the first edge of the array by dark reference or dummy pixels.

Conveniently, providing a second at least one peripheral row of trigger pixels comprises providing at least one second peripheral row of trigger pixels spaced from the second edge of the array.

Advantageously, the method comprises providing at least one second peripheral row of trigger pixels spaced from the second edge of the array spaced by dark reference or dummy pixels.

Conveniently, the method comprises: holding the image pixels in reset; addressing the trigger pixels from the first and second peripheral rows alternately in the predetermined pattern to detect the beginning of a radiation signal; on detecting the beginning of a radiation signal removing the reset from the image pixels; and integrating charge from the image pixels for a predetermined time period and reading out integrated charge from the image pixels.

Advantageously, integrating charge from the image pixels additionally comprises: addressing the trigger pixels from the first and second peripheral rows alternately in the predetermined pattern to detect an end of the radiation signal; on detecting an end of the radiation signal, reading out the integrated charge from the image pixels.

Alternatively, the method comprises: integrating charge in the image pixels and trigger pixels; addressing the trigger pixels from the first and second peripheral rows alternately in the predetermined pattern to detect the beginning of a radiation signal; if no radiation signal is detected after a predetermined time period, resetting the image pixels and trigger pixels and restarting from step a; on detecting the beginning of a radiation signal continuing to integrate charge in the image pixels for a predetermined time period; and reading out integrated charge from the image pixels.

Advantageously, reading out charge from the image pixels comprises the additional steps of: continuing to integrate charge in the image pixels while resetting the trigger pixels and addressing the trigger pixels from the first and second peripheral rows alternately in the predetermined pattern to detect an end of the radiation signal; on detecting an end of the radiation signal, reading out the integrated charge from the image pixels.

Conveniently, the trigger pixels are reset in rolling reset mode, in which a trigger pixel is reset as a next addressed trigger pixel is read.

Advantageously, the method is arranged for intra-oral imaging of x-rays.

BRIEF DESCRIPTION OF THE SEVERAL VIEWS OF THE DRAWING

The invention will now be described, by way of example, with reference to the accompanying drawings in which:

FIG. 6 is a flowchart of a third embodiment of a method of triggering an x-ray sensor according to the invention; and FIG. 7 is a flowchart of a fourth embodiment of a method of triggering an x-ray sensor according to the invention In the Figures like reference numerals denote like parts.

DETAILED DESCRIPTION OF THE INVENTION

Figure 1:
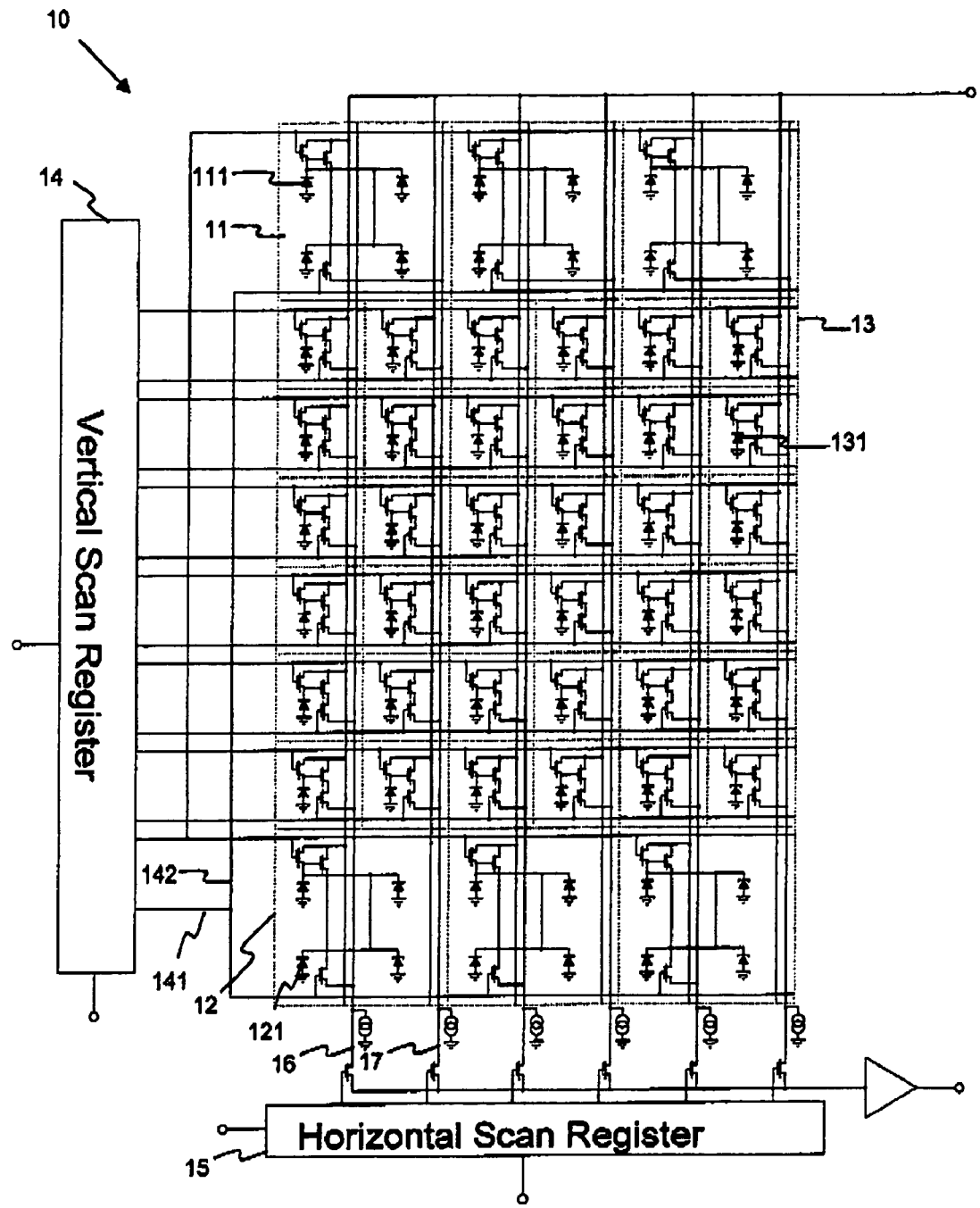
FIG. 1 is a circuit diagram of a first image array according to the invention, with vertical rolling reset.

Referring to FIG. 1, a CMOS image array 10 according to the invention has a plurality of rows of image pixels 13, read by a vertical scan register 14 and a horizontal scan register 15 in a known manner. In addition there are provided a top row of trigger pixels 11 and a bottom row of trigger pixels 12. The trigger pixels 11, 12 each occupy four times an area of each of the image pixels and have four photodiodes 111, 121 connected in parallel compared with a single photodiode 131 in the image pixels 13. Otherwise the circuits of the trigger pixels 11, 12 are similar to the circuits of the image pixels 13, but may be optimised differently, as described herein. It will be understood that the drawing is illusive only, and that a practical array would normally have many more pixels than those illustrated.

The vertical scan register 14 and horizontal scan register 15 may be simply shift registers which offer the least susceptibility to fixed pattern noise from counter logic feedthrough. However, such registers tend to restrict operation of the array to basic raster scanned modes. Other scan circuits may therefore alternatively be used, such as a counter/decoder or a random access 1 of N decoder.

Although the invention has been described with rows of trigger pixels at opposed edges of the image array, it will be understood that instead trigger pixels may be provided at just one edge, and be addressed in the same manner as the image pixels.

Figure 3:
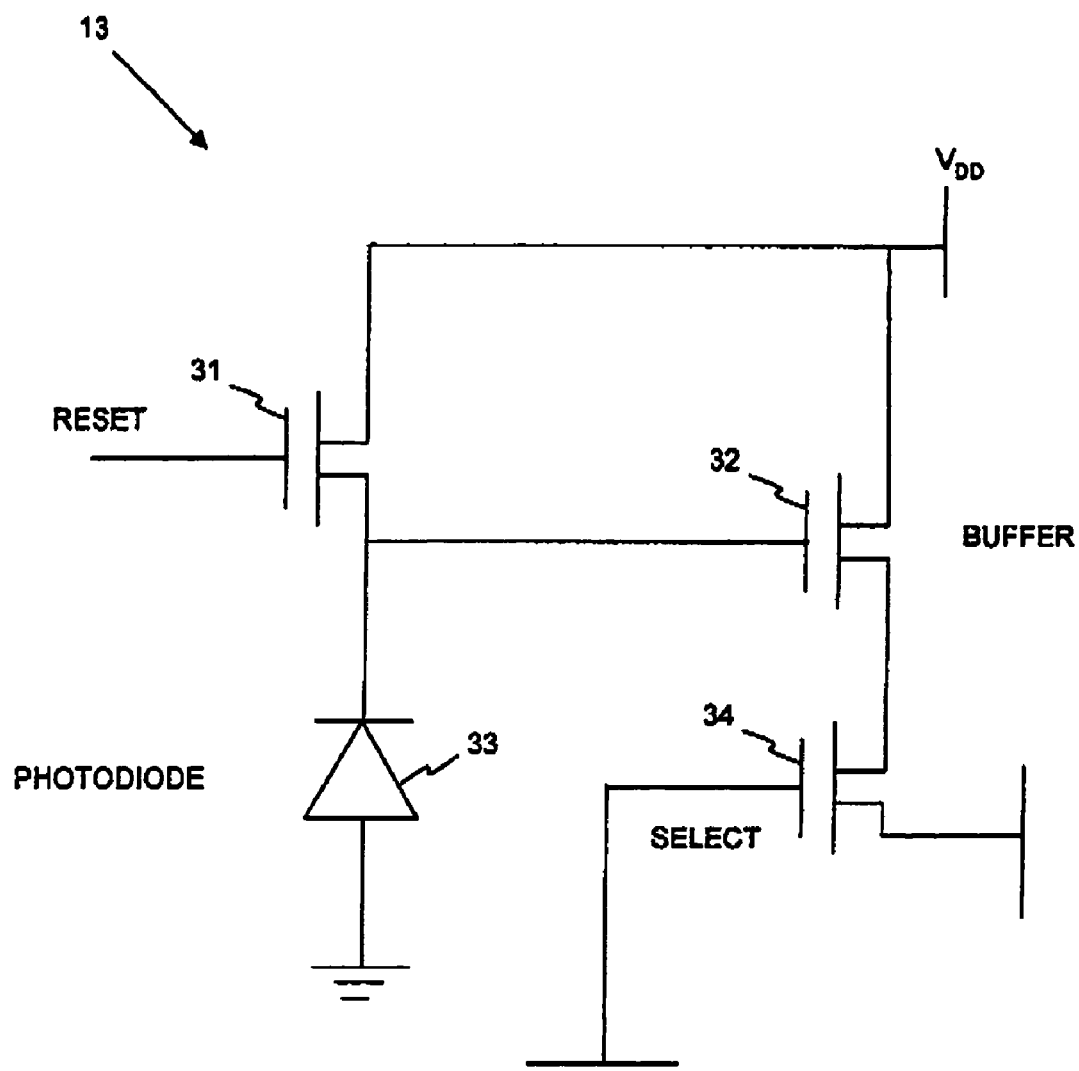
FIG. 3 is an enlargement of an individual image pixel circuit of FIGS. 1 and 2.

The photodetectors are not necessarily photodiodes, the illustrated structure uses a three-transistor photodiode pixel, but the invention is applicable to almost any other pixel structure. A basic three transistor pixel 13, as shown in FIG. 3, includes a reset transistor 31, a source follower, buffer transistor 32 with its gate connected to a photodiode 33, and a pixel switch transistor 34 which connects the output of the follower 32 to a column line.

However, numerous variants of pixel structure are known and any type could be used with the invention. The trigger pixels could be a different type from the image pixels. The imaging pixels could be photo-gates and the trigger pixels simple photodiodes, or vice versa—they are differently optimized and a manufacturing process may allow shallow well structures of one type and deep well structures of another type to be made on a same chip, as discussed herein.

An objective is to make the trigger pixels sensitive so that they trigger quickly. Sensitivity is a measure of a minimum signal that can be detected, and depends on both responsivity and noise. Trigger pixels with high sensitivity will tend to produce reliable detection of x-ray onset with fewer false triggers. Responsivity is expressed in terms of the signal voltage output by a pixel per unit x-ray dose. If readout noise is assumed to be constant, sensitivity and responsivity are directly related. Responsivity has two components, a charge generated per x-ray photon and a charge to voltage conversion factor of the detector. It will be desirable to produce a pixel signal several times greater than the noise floor from an input dose of less than a few µGy.

Figure 2:
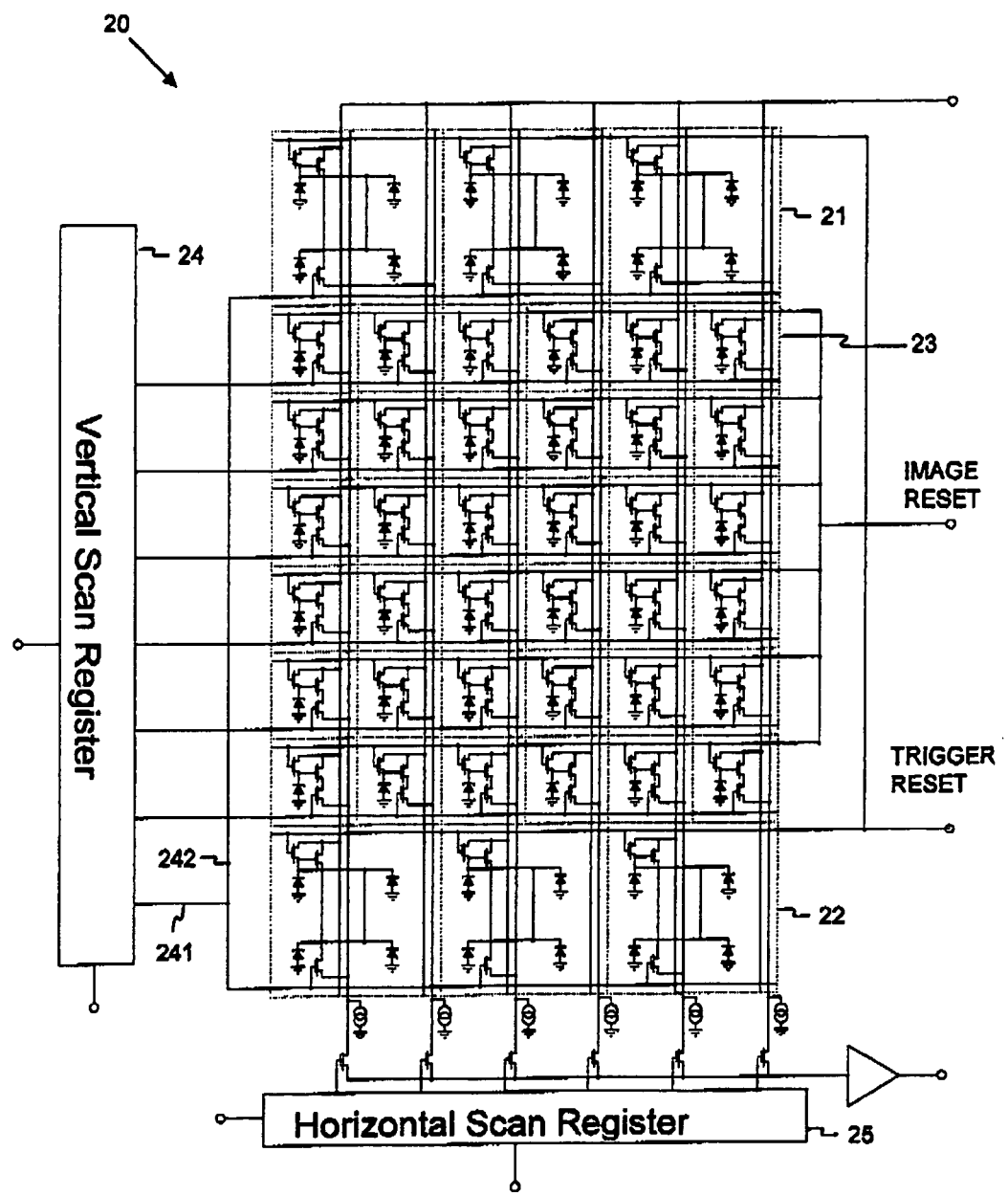
FIG. 2 is a circuit diagram of a second image array according to the invention, with separate global reset.

One way in which to make the trigger pixels more sensitive than the image pixels is to make them twice as large in a horizontal direction. Because of a manner in which they are addressed, to be described herein, they are inherently on double a pitch in a horizontal direction, compared with the image pixels, and it is advantageous to make hem twice a width of the image pixels to make a detection area larger in order to detect more photons. Alternatively, the width of the trigger pixels could be any multiple of the width of the image pixels, for example 4, 8 or 16 times the width of the image pixels. Because the trigger pixels 11, 12 are at edges of the array 10, they may readily be made several times the height of the image pixels as well, as illustrated in FIGS. 1 and 2. Their larger size has been emphasised by showing four separate photodiodes 111, 121 in each trigger pixel in FIGS. 1 and 2, but this is not necessary. The trigger pixels 11, 12 could include multiple diodes or a single large diode. However, because charge on a capacitor is detected to read the array 10, there is no benefit in making the area of the pixel larger, if the capacitance is similarly increased, because the voltage output will be substantially the same as a normal size pixel 13. Therefore, it is desirable that a trigger pixel 11, 12 has a large detection area, with a small detection capacitance. With the simple pixel architecture described, charge is detected on a capacitance which consists of a combination of the photodiode and sense transistor capacitances. This capacitance will increase to some extent with photodiode area and so the overall sensitivity increase for the trigger pixels over the imaging pixels will generally be less than the pixel area ratio. The photodiode capacitance will have both edge and area dependant components while the sense transistor component will be essentially constant if the same sense circuit is used. In other pixel architectures, e.g. photo-ate and pinned photodiode structures, charge is transferred from the collection site (photo-gate or pinned photodiode) to a detection node (gate of sense transistor) by means of an additional wander gate. In this case the detection node capacitance remains small when the pixel size is increased, so sensitivity rises approximately proportionately with pixel area.

The image pixels need to be designed with sufficient capacitance to store the signal charge corresponding to the maximum expected exposure and to read the signal charge out as a voltage signal within the range of on-chip video circuits. Trigger pixels 11, 12 may be designed with higher sensitivity, as there is no need to avoid saturating the pixel with charge or to avoid clipping of the voltage signal.

A further factor which can help increase the sensitivity of the trigger pixels is a larger fraction of their area which is photosensitive. A significant part of the imaging pixels is occupied with reset and readout transistors which are not photosensitive; these components occupy roughly a same area in a trigger pixel—and therefore cover a smaller fraction of the total pixel area. As for any sensor, there is also a need to achieve a known balance between dark response and photoresponse. The dark response will normally increase with area in a same way as photoresponse—there tends to be a reasonably constant ratio—although there are issues of edge components and area components for dark signal.

X-rays can generate charge in a detector pixel either through a direct interaction in the silicon or through an interaction in a scintillator, which emits light and this in turn generates charge in the detector pixel.

Direct charge generation in the silicon is useful at low x-ray energies and is used in, for example, x-ray astronomy. However, for medical x-ray energies the fraction of incident x-rays absorbed in the active depth of silicon is rather low and so much of the patient's x-ray dose would be wasted. Furthermore, each directly absorbed x-ray generates of the order of a thousand signal electrons, so the saturation signal level for a typical pixel would be only a few hundred photons resulting in a low signal to noise ratio because of photon shot noise. Scintillator-based systems are preferred for medical x-ray use as the scintillator absorbs a larger fraction of the incident x-rays and signal transfer to the detector means a signal of the order of a hundred electrons per x-ray photon. These effects combine to give higher sensitivity and wider dynamic range.

However, a fraction of the x-rays penetrate the scintillator and generate signal directly in the silicon. This signal degrades the overall dynamic range of the system and so in many applications a fibre optic coupler is used between the scinillator and the sensor in order to block these direct-hit x-rays, while passing a majority of the visible photons.

Standard (CMOS) process active-depth photodiodes can be used, and this (as compared say to a CCD) helps discriminate against signal directly generated in the silicon The visible photons from the scintillator will be absorbed predominantly within a top micron of the silicon, whereas direct hit x-rays generate signal over a much greater depth.

For the imaging pixels it is desirable to detect only a signal from the scintillator in order to maximize dynamic range. For the trigger pixels dynamic range is less important and highest sensitivity is desired so the direct x-ray signal is useful. Photodiodes with a greater active depth in the trigger pixels may be advantageous—but only for systems which do not use a fibre optic over the trigger pixels.

It will therefore be understood that the trigger pixels, although similar to the image pixels, are not only separate from the image area, but they are also preferably differently optimized. This differs from the known use of standard image pixels as trigger pixels. If the trigger pixels 11, 12 were the same as the image pixels 13 it would be necessary to detect small trigger signals.

Although it is preferable to design the trigger pixels to optimize their sensitivity in order to make the trigger sensitive, some of the suggested operating modes discussed herein do not require high sensitivity, as charge generated in the image pixels before the trigger is collected as useful signal. That is, in a mode discussed herein in which the trigger pixels are read periodically to determine whether a signal has been received, and the pixels reset if not, although the trigger pixels do not need to be particularly sensitive, there are advantages in making them reasonably sensitive.

An important advantage of the arrays of FIGS. 1 and 2 is that the trigger pixels 11, 12 use a same register address circuitry as the image pixels 13, are read through a same port as the image pixels 13 and optionally may be fed to a same PC for processing.

Although in FIGS. 1 and 2 single rows of peripheral trigger pixels have been illustrated at a first edge of the array and at an opposed second edge of the array respectively, more than one row of trigger pixels may be provided. Moreover, the trigger rows may be immediately adjacent to the array of image pixels as illustrated or at one or both of the first and second edges may be separated from the array of image pixels by dark reference or dummy pixels. Alternatively, one or more rows of trigger pixels may be at an edge of the image array and one or more rows of trigger cells spaced from the edge. Moreover, any of the rows of trigger pixels may not be formed of contiguous pixels, as shown, but of spaced apart trigger pixels.

The rows of trigger pixels 11, 12 at the top and bottom of the array 10, respectively, which are twice as wide as the standard image pixels 13, are connected alternately to the column signal lines 16, 17. Thus reading from the left in FIG. 1, the first column signal line 16 is connected to the first bottom row trigger pixel 12 and to the first image pixel 13 in each image pixel row, whereas the second column signal line 17 is connected to the second image pixel in each image pixel row and to the first trigger pixel cell 11 in the top pixel row. Therefore, when the horizontal register 15 is scanned in the normal way, a signal is alternately received from a top row trigger pixel 11 and a bottom row trigger pixel 12. Thus, every time the horizontal scan is run, with the vertical register 14 set to address a pair of rows, the top and bottom trigger rows will alternately be read. However, a number of times the trigger pixels 11, 12 are read per frame will depend on how the vertical register 14 and horizontal register 15 are clocked. Typically, the vertical register 14 is paused in a position where the register is addressing the trigger pixels 11, 12 and the trigger pixels are read a plurality of times while waiting to trigger. However, when reading the image pixels 13, the signals from the trigger rows may be ignored, and the rest of the array scanned with a normal pass of the vertical register 14. However, it will be understood that other modes of use are possible.

The row address for the trigger pixels is common to the top and bottom rows of trigger pixels 11, 12, so that a single output 141 from the vertical scan register 14 addresses both rows of trigger pixels simultaneously. Two ways of doing this are described herein. The first, as shown in FIG. 1, is to connect the top and bottom rows directly to the vertical scan register 14 so that a single output 141 from the scan register 14 is connected directly to the bottom row of trigger pixels 12 and a long track 142 runs up a side of the array 10 to the top row of trigger pixels 11.

Alternatively, referring to FIG. 2, in a global reset array 20, address lines from the vertical register 24 feed into the normal pixels 23 and one address line 241 at the bottom feeds both the bottom row of trigger pixels 22 and there is an extra track 242 going up to the top row. Alternatively, the trigger rows may be selected from separate outputs of the scan register 24, but with the scan register operated in such a way that the top and bottom trigger pixels can be selected simultaneously. In practice, the scan registers 24, 25 are normally shift registers, where a single '1' bit is clocked through a series of stages. If a next '1' is started through the register before the previous '1' has finished, there will be a bit in each stage, with a '1' which addresses the top and a '1' which addresses the bottom simultaneously. That is, normally there will be a '1' bit going through the register but just before the '1' gets to the end to address the last row of image pixels, another '1' would be entered so that there is a '1' bit addressing the top row and another '1' bit addressing the bottom row, and all the bits in between are zeros.

A principal advantage of alternately reading top and bottom trigger pixels 11, 12 is that it is improbable that all the trigger pixels will shielded by, for example, a metal holder, or a dental filling in the scanned object. The alternating address line structure also means that the trigger pixels can be at least double the size of the image pixels.

A predetermined threshold is used in determining whether a trigger pixel has detected x-rays. Signal levels from the trigger pixels are compared with the threshold as part of the triggering process, Although this threshold will be predetermined, the threshold may be adapted to suit ambient conditions, in a known manner. A set of rules for triggering based on a number of pixels with signal above the threshold on one or more readouts of the trigger pixel rows is probably required to give a best trade-off between trigger sensitivity and immunity to false triggering. For instance, the instantaneous signal level could be compared to a rolling average. The fact that the output from the trigger pixels is directly processed through the normal video and ADC chain is an advantage in analysis of the trigger pixel signals.

There are options in resetting the main array pixels and the trigger pixels. It is known that with CMOS imaging, a rolling reset may be used, so that after a signal has been read from a row of pixels the row is reset. Therefore a row is reset when a next row of pixels is addressed, that is, when addressing one row the previous row is being reset. A similar reset is used in one embodiment with the present structure. However, it may be preferable to provide separate global reset lines, so that all the image pixels can be reset simultaneously. A separate line resets all the trigger pixels simultaneously—or, alternatively, separate reset lines are provided for the top and bottom trigger pixels, respectively.

As intimated, there are various possible operating modes of an array according to the invention.

Figure 4:
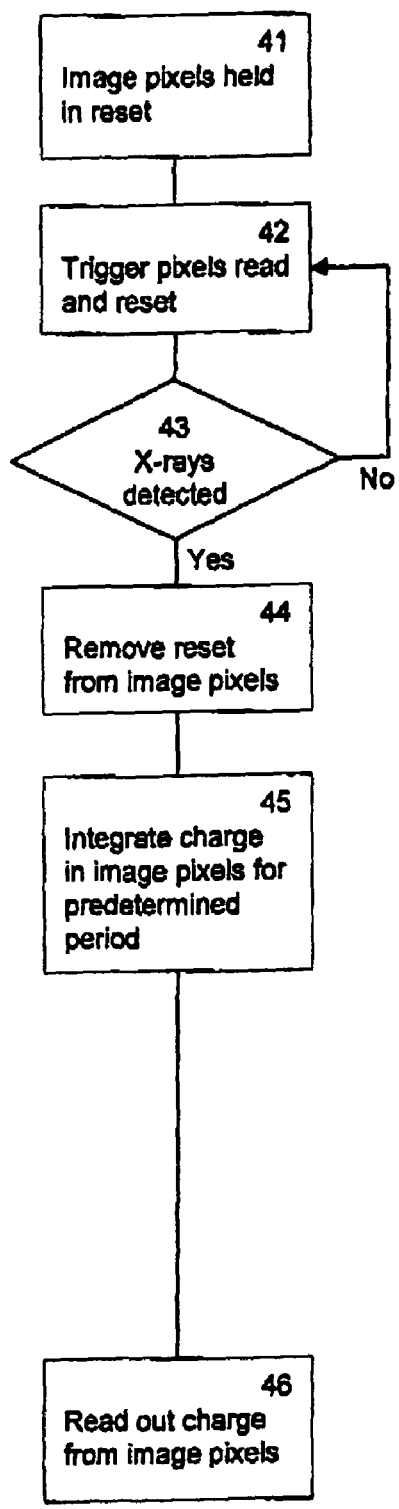
FIG. 4 is a flowchart of a first embodiment of a method of triggering an x-ray sensor according to the invention.

Referring to FIG. 4, a first method is a standby mode, in which the main array is held in reset, step 41, and the trigger rows are periodically read and reset step 42. When an x-ray signal is detected, step 43, by the trigger pixels the reset is removed, step 44, from the main array and integration begun, step 45 and the main array is read out, step 46, after a predetermined period.

Figure 5:
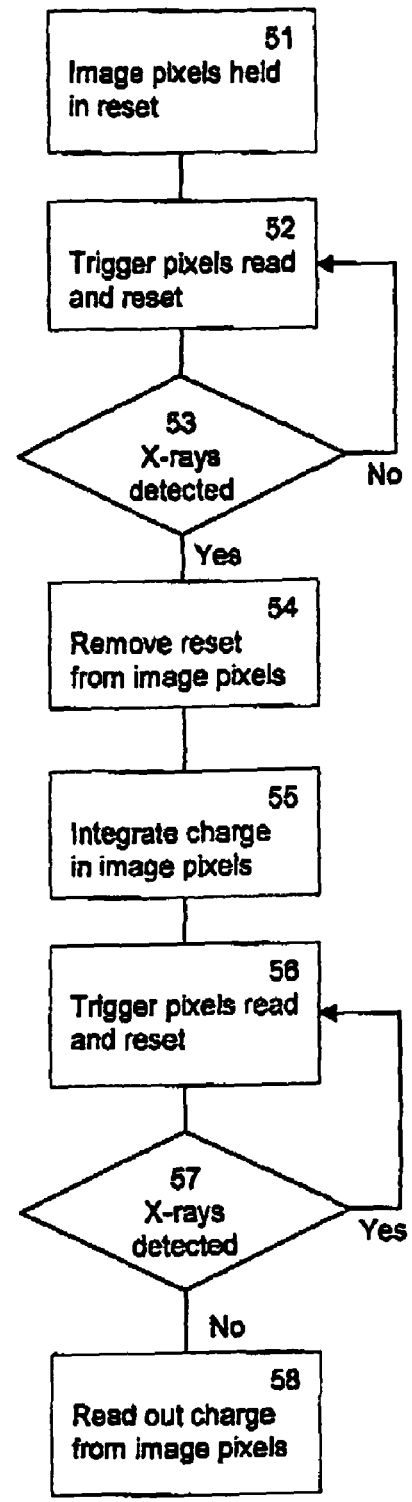
FIG. 5 is a flowchart of a second embodiment of a method of triggering an x-ray sensor according to the invention.

In a second method, illustrated in FIG. 5, the trigger pixels are additionally read during x-ray emission to determine when the irradiation ceases. Thus the main array is held in reset, step 51, and the trigger rows are periodically read and reset step 52. When an x-ray signal is detected, step 53, by the trigger pixels the reset is removed, step 54, from the main array and integration begun, step 55. The trigger rows continue to be read and reset, step 56, until it is detected, step 57, by the trigger pixels that the x-ray signal has stopped. The main array is then read out step 58. This is similar to known trigger modes, in principle almost any mode used with an external diode as a trigger can also be used with the invention.

Third and fourth methods are based on keeping the main array sensitive during standby but resetting it periodically. Referring to FIG. 6, in the third method, charge from both the main pixels and the trigger pixels is integrated, step 61, the trigger pixels read, step 62, to determine, step 63, whether there has been a signal. If not, the trigger and image pixels are reset step 64. If there has been a signal in the trigger pixels, integration continues, step 65, in the main array, and, the integrated charge is read out, step 66, from the image pixels after a predetermined period.

Referring to FIG. 7, in the fourth method, charge from both the main pixels and the trigger pixels is integrated, step 71, the trigger pixels read, step 72, to determine, step 73, whether there has been a signal. If not, the trigger and image pixels are reset step 74. If there has been a signal in the trigger pixels, the trigger pixels are reset, step 75, and integration continues, step 76, in the trigger pixels and the main array. The trigger pixels are read, step 77 to detect, step 78, whether x-rays continue to be detected. If so, the trigger pixels are reset, step 79, and integration of charge in the main array and trigger pixels continued. If x-rays are no longer detected, the integrated charge is read out, step 80, from the image pixels. Depending on a choice of period this method could be very effective, because an extremely high signal could have built up in the trigger pixels, and is very easy to detect that a particular frame had a trigger in it.

Effectively, the most that would ever be lost of an x-ray signal would be a minimum time period in which a useful trigger signal can be generated. Using a period of 10 milliseconds in which the trigger pixels integrate, if an x-ray source emits in a last millisecond of those 10 milliseconds, the system needs to decide whether or not there was a signal in that last millisecond. However, if this is not possible, only one millisecond worth of signal would be lost, of what could be a 10 millisecond signal at least, and probably is a 100 milliseconds signal, so that only a small proportion of the exposure would be lost.

The advantage of the third and fourth methods of integrating and periodic resetting is that most of the time a signal will be detected, whereas with resetting and switching on the image pixels when a signal is detected in the first and second methods sometimes a beginning of an x-ray signal may be lost.

However, because of using a more sensitive trigger pixel, the invention will, in any case, provide an advantage over current sensors.

Increased sensitivity results in a proportional decrease in an exposure time required for an output signal voltage to reach the 'predetermined threshold'—and thus a desirable decrease in the trigger latency.

This is particularly important in the first and second operating modes, where the image pixels are held in reset until trigger. This mode has the advantage that dark signal in the standby period is eliminated but all x-ray generated signal before the trigger point is also lost. A critical parameter is a fraction of the total exposure which is lost i.e. the ratio of a time between onset of exposure and trigger to a total exposure time. It is therefore desirable to trigger at a dose which is a small faction of the full exposure. The full exposure may in turn be significantly less than the sensor saturation level if patient dose is being minimised so sensitivity of trigger pixels is important. X-ray flux rates are generally fairly constant so low exposures correspond to short exposure times. The response time of the trigger therefore needs to be short in comparison with the shortest exposure likely to be encountered, which is currently around 10 ms. This, in turn, sets some constraints on a rate at which the trigger pixels must be read and on the rules used to determine the trigger point and such times are likely to be around 1-2 ms.

In the third opening mode, these constraints are slightly more relaxed as an interval between resets of the image pixels can be extended to perhaps several hundred milliseconds or more, depending on a rate of dark signal generation. Most short exposures will therefore fall entirely within such a period and the trigger signal can be detected from the whole exposure. However, some exposures will still span the point at which the image pixels would be reset in the absence of a trigger so a fast and sensitive trigger circuit is still advantageous. In the fourth operating method described herein, when repeated reading of the trigger pixels during exposure is used for initiating readout or for dose monitoring, a relatively short period between successive readings of the trigger pixels is again required.

The trigger pixels can also be used for monitoring an exposure by periodically resetting the trigger pixels and determining when a signal stops being generated. This is another usage. Apart from basic trigger and integrating image, it is very useful to be able to detect what, for example, a dentist did when an image was made. Very often the image gets processed and contrast stretched and the signal value in the image is lost. If there is a method of detecting that the x-ray turned on at time t=0 and turned off at, say, time t=50 milliseconds, then that information can be added to an image file, so that not only is an image of a patients tooth stored, but also a statistic that the image was of 50 millisecond duration, as detected by the sensor. This meets a requirement for radiation monitoring of the population. A dosage a population has received from dental x-rays can be calculated from the number of milliseconds of radiation received, with a known setup of tube current and voltage and distance from the patient, the number of milliseconds provides a reasonably good indicator of dose.

A further method of use of the array of the invention is a subset of the other methods, varying from them in how the trigger pixels are reset during trigger detection and during a dose monitoring period. It may be advantageous to run the trigger pixels in rolling reset mode, so that as soon as a pixel has been read, the pixel is reset and integration of charge in the pixel starts again. Therefore, the horizontal register could be clocked at a set rate and just read each pixel in turn. It is straightforward to do that for the bottom row of trigger pixels, because one trigger pixel can be reset with the read signal for a next one, but it is not so easy to do a rolling reset for the top row. For the bottom row, output from the scan register which addresses one pixel, resets the previous pixel at the same time. It is the same as the vertical rolling reset. For the top row it would be necessary to provide an extra track per pair of columns for the height of the array, which would add extra density and obscure portions of the pixel, or to use a second scan register at the top, which simply did the reset for the top row.

Although the invention has been described in respect of CMOS devices, as CMOS processes are widely available because of general performance advantages, it will be understood that the invention could be used with other technologies, such as NMOS or PMOS.

Although the method of the invention has been described as addressing peripheral trigger pixels sequentially in rows alternately at the first edge of the array and at the opposed second edge of the array, by using counter/decoder circuits instead of shift registers, the trigger pixels may be addressed in any predetermined alternate pattern, for example: top left, bottom right, top middle, bottom middle and so on.

Although the invention has been described in respect of intra-oral x-ray sensors, it will be understood that the invention has application to other types of x-ray sensor.

Although the invention has been described in respect of x-ray sensors, it will be understood that the invention has application to other types of solid-state radiation sensor. In principle, the invention could be applied to any situation where an image sensor needs to be synchronised to an external pulsed illumination source, which could be a LED or a laser. The optical system preceding the sensor would include a narrow band pass filter centered on the illumination wavelength. Prior to triggering, very little light would fail on the sensor, and dark current would be dumped. On receipt of a light pulse, triggering would occur as described. This is applicable to any illuminator which is difficult to synchronize to a sensor/camera framing frequency—particularly a high power laser. A suitable application may be long range covert 'single snapshot' surveillance, or multi-frame imaging at regular or infrequent/irregular intervals (for maximum covertness), with averaging of images captured to reduce the noise, in which a CMOS device is back-thinned and included in an intensifier envelope. Such an imager would have high sensitivity and a fast and reliable trigger.

The invention provides at least the following the advantages over the prior art. No disc photodiodes are required for x-ray triggering. Moreover, an image portion of the array, containing the image pixels, is used only for imaging, and not for triggering, so that no trigger artifacts or fixed pattern noise are introduced into the image by the trigger pixels. A large number of trigger pixels covering a large area immediately above and below the image area provide a high probability of trigger. The trigger pixels can be scanned quickly—within one row of readout time. The trigger pixels use a same video output, same shift register address circuitry and same processing as the image pixels. Moreover, the trigger pixels may be less obscured by metal layers than the image pixels.

Use of the trigger pixels to monitor the exposure by repeated reading during the exposure has three main benefits.

Firstly, by allowing readout to start immediately the exposure has finished dark signal components are minimized. Otherwise the integration period would need to be greater than the longest expected exposure and dark signal from this could be significant in comparison with the weak signal from a short x-ray exposure.

Secondly, some degree of patient dose monitoring is achieved.

Thirdly, the invention allows a possibility of avoiding saturation of the imaging pixels. This could be achieved either by sending a signal to the x-ray generator or by stopping collecting charge in the image pixels. The first of these options requires an interface with the x-ray source, the existence of which would presumably remove the need for a trigger, the second requires a more complex pixel architecture.

I claim:

1. An x-ray radiation sensor comprising:
an array of imaging pixels electrically connectable by addressing means to a readout port and at least one first peripheral row of trigger pixels at a first edge of the array, the trigger pixels being electrically connectable to the readout port;
wherein:
the trigger pixels have a more rapid response to detection of x-rays than the imaging pixels; and
the trigger pixels are readable by the same addressing means as the array of imaging pixels;
at least one second peripheral row of trigger pixels at a second edge of the array opposed to the first edge;
wherein the trigger pixels from the first and second peripheral rows are addressable alternately in a predetermined pattern to detect a beginning of an exposure; and
wherein each of the trigger pixels has a larger radiation detection area than each of the image pixels.

2. A radiation sensor as claimed in claim 1, wherein the trigger pixels are more sensitive to radiation than the image pixels.

3. A radiation sensor as claimed in claim 1, arranged for use in an intra-oral x-ray imager.

4. A radiation sensor as claimed in claim 1, wherein each of the trigger pixels has a radiation detection area that is at least double the size of each of the image pixels.

5. A method of triggering an x-ray radiation sensor comprising an array of image pixels electrically connectable to a readout port by addressing means for addressing the array, the method comprising:

providing at least a first peripheral row of trigger pixels at a first edge of the array and at least one second peripheral row of trigger pixels at a second edge of the array opposed to the first edge, the trigger pixels being electrically connectable to the readout port by the addressing means and having a more rapid response to detection of x-rays than the imaging pixels; and addressing the trigger pixels from the first and second peripheral rows alternately in a predetermined pattern, with the said addressing means used to address the array, to detect a radiation signal for triggering the sensor;

wherein each of the trigger pixels has a larger radiation detection area than each of the image pixels.

6. A method as claimed in claim 5, comprising:

holding the image pixels in reset;

addressing the trigger pixels from the first and second peripheral rows alternately in the predetermined pattern to detect the beginning of a radiation signal;

on detecting the beginning of a radiation signal removing the reset from the image pixels; and integrating charge from the image pixels for a predetermined time period and reading out integrated charge from the image pixels.

7. A method as claimed in claim 6, wherein integrating charge from the image pixels additionally comprises:

addressing the trigger pixels from the first and second peripheral rows alternately in the predetermined pattern to detect an end of the radiation signal;

on detecting an end of the radiation signal, reading out the integrated charge from the image pixels.

8. A method as claimed in claim 5, comprising:

integrating charge in the image pixels and trigger pixels;

addressing the trigger pixels from the first and second peripheral rows alternately in the predetermined pattern to detect the beginning of a radiation signal;

if no radiation signal is detected after a predetermined time period, resetting the image pixels and trigger pixels and restarting from step a;

on detecting the beginning of a radiation signal continuing to integrate charge in the image pixels for a predetermined time period; and reading out integrated charge from the image pixels.

9. A method as claimed in claim 8, wherein the step of reading out charge from the image pixels comprises the additional steps of:

continuing to integrate charge in the image pixels while resetting the trigger pixels and addressing the trigger pixels from the first and second peripheral rows alternately in the predetermined pattern to detect an end of the radiation signal;

on detecting an end of the radiation signal, reading out the integrated charge from the image pixels.

10. A method as claimed in claim 5, wherein the trigger pixels are reset in rolling reset mode, in which a trigger pixel is reset as a next addressed trigger pixel is read.

11. A method as claimed in claim 5, arranged for intra-oral imaging of x-rays.

* * * * *